(12) United States Patent
Peterson et al.

(10) Patent No.: US 10,974,973 B2
(45) Date of Patent: Apr. 13, 2021

(54) UV REACTOR WITH PTFE DIFFUSER

(71) Applicant: A. O. Smith Corporation, Milwaukee, WI (US)

(72) Inventors: Kenneth Allen Peterson, Shorewood, WI (US); Chen Li, Menomonee Falls, WI (US)

(73) Assignee: A. O. Smith Corporation, Milwaukee, WI (US)

( * ) Notice: Subject to any disclaimer, the term of this patent is extended or adjusted under 35 U.S.C. 154(b) by 88 days.

(21) Appl. No.: 16/261,069

(22) Filed: Jan. 29, 2019

(65) Prior Publication Data

US 2019/0233308 A1 Aug. 1, 2019

Related U.S. Application Data

(60) Provisional application No. 62/624,406, filed on Jan. 31, 2018.

(51) Int. Cl.
*C02F 1/48* (2006.01)
*C02F 1/32* (2006.01)

(52) U.S. Cl.
CPC ............... *C02F 1/325* (2013.01); *C02F 1/48* (2013.01); *C02F 2201/322* (2013.01); *C02F 2201/328* (2013.01); *C02F 2201/3223* (2013.01); *C02F 2201/3228* (2013.01); *C02F 2303/04* (2013.01)

(58) Field of Classification Search
CPC .......... A61L 2/10; A61L 2/24; A61L 2202/11; A61L 2202/14; A61M 16/161; A61M 2205/3306; F24F 6/00
See application file for complete search history.

(56) References Cited

U.S. PATENT DOCUMENTS

| | | | |
|---|---|---|---|
| 5,675,153 A | 10/1997 | Snowball | |
| 6,193,894 B1 | 2/2001 | Hollander | |
| 6,610,258 B1 * | 8/2003 | Strobbel | B01D 53/007 422/186.3 |
| 2011/0168898 A1 * | 7/2011 | Statham | A61L 9/20 250/354.1 |
| 2012/0168641 A1 | 7/2012 | Lizotte | |
| 2019/0100445 A1 * | 4/2019 | Dobrinsky | A61L 2/10 |

* cited by examiner

*Primary Examiner* — Cameron J Allen
(74) *Attorney, Agent, or Firm* — Michael Best & Friedrich LLP

(57) ABSTRACT

A UV reactor for treating water, the reactor includes a UV source, a tube positioned around the UV source, a surrounding structure coaxially surrounding the tube, a flow path positioned between the tube and the surrounding structure for the flow of water to be treated, and a diffusive surface positioned around the surrounding structure to reflect UV light from the UV source back into the flow path.

20 Claims, 2 Drawing Sheets

UV REACTOR WITH PTFE DIFFUSER

BACKGROUND

The present invention relates to an ultraviolet (UV) reactor for use in a water treatment system.

UV sources, which may be for example UV lamps and LED's, are commonly used in water treatment to treat biologically unsafe water to remove bacteria, cyst and virus. Typical reactor designs position the UV source in a quartz tube because quartz is transmissive to UV light. The quartz tube is typically coaxially positioned within a surrounding structure spaced from and facing the quartz. The surrounding structure includes a reflective surface which significantly increases UV radiation intensity within the reactor. Often, the surrounding structure is aluminum or stainless steel and the reflective surface is an internally-facing polished surface of the surrounding structure. Water flows in the annular region between the quartz tube and the reflective surface. UV light generated by the UV source passes through the quartz tube to treat the water. The UV light reflects off the reflective surface, back through the water to increase the UV radiation intensity with the water in the reactor.

The cost of the polished aluminum or stainless steel significantly contributes to the cost of the UV reactor. The cost further increases as the quality of the polished surface increases in order to increase the efficiency of the surface reflectivity. Recently, PTFE has been used in UV reactors as a diffusive surface to increase the UV radiation intensity with the water. The fabrication of PTFE reactors requires expensive machining. PTFE faces many challenges when used as a diffusive coating because it is a semi-crystalline thermoplastic. Specifically, PTFE may either be transparent or reflective to UV light depending on light scattering on boundaries between crystalline and amorphous regions. An amorphous state PTFE is transparent to UV. Reflectivity of PTFE depends on the thickness and crystalline level of the material. Traditional PTFE coating processes often produce a thin, amorphous layer over the surface. Because of these challenges, PTFE coating processes often result in transparent layer rather than a reflective layer.

SUMMARY

In one embodiment, the invention provides a UV reactor for treating water, the reactor including a UV source, a tube positioned around the UV source, a surrounding structure coaxially surrounding the tube, a flow path positioned between the tube and the surrounding structure for the flow of water to be treated, and a diffusive surface positioned around the surrounding structure to reflect UV light from the UV source back into the flow path.

In another embodiment, the invention provides a method of securing a diffusive surface to a surrounding structure of a UV reactor, the UV reactor including a UV source, a tube surrounding the UV source, the surrounding structure coaxially surrounding the tube, and the diffusive surface positioned around the surrounding structure. The method includes fitting the diffusive surface over the surrounding structure, applying heat to the diffusive surface, determining the material property state of the diffusive surface, and cooling the diffusive surface after determining the diffusive surface is in an amorphous state.

In another embodiment, the invention provides a method for treating water via a UV reactor, wherein the UV reactor includes a UV source, a tube surrounding the UV source, a surrounding structure coaxially surrounding the tube, and a PTFE diffusive surface positioned around the surrounding structure, the method including emitting UV light via the UV light source, transmitting the UV light through the tube and into an annular flow path between the tube and the surrounding structure, transmitting the UV light through a quartz wall of the surrounding structure, and reflecting the UV light off of the PTFE diffusive surface, through the quartz wall of the surrounding structure, and through the annular flow path.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
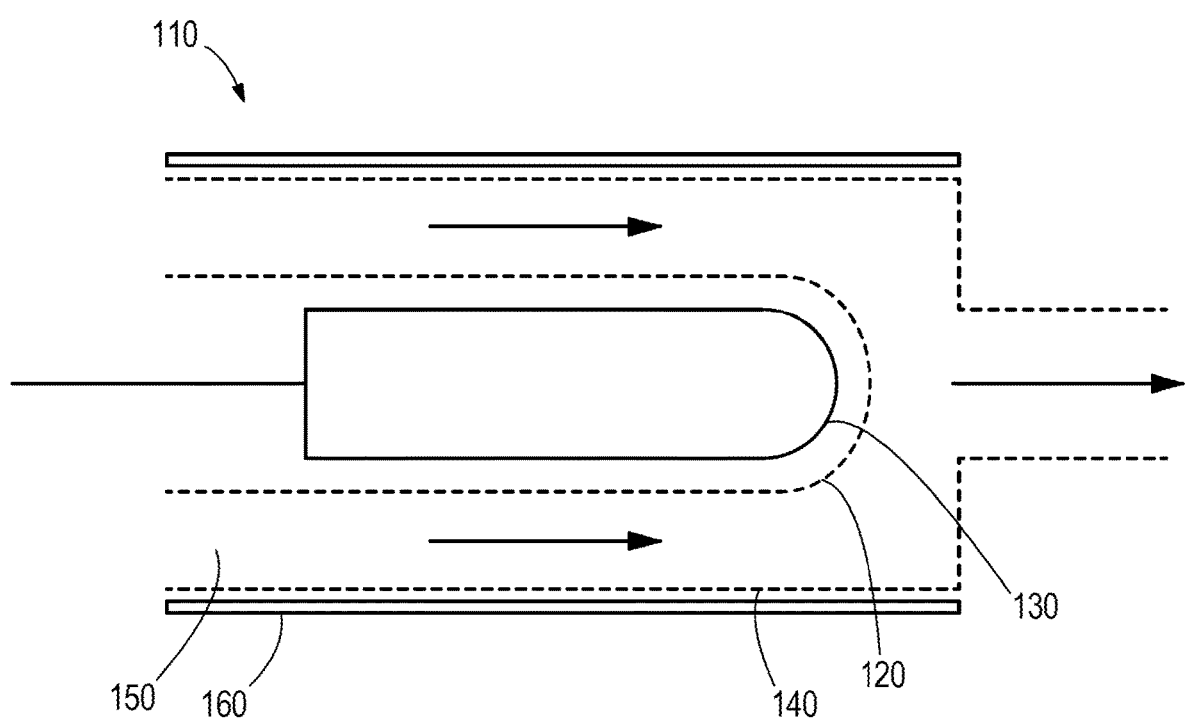
FIG. 1 is a perspective view of a UV reactor embodying the invention.

FIG. 1 illustrates a UV reactor 110 embodying the invention. The reactor 110 includes a quartz tube 120 containing a UV source 130, and a surrounding structure 140 coaxially positioned around the quartz tube 120. In the illustrated embodiments, the surrounding structure 140 is quartz. However, in alternative embodiments, the surrounding structure 140 may be composed of alternative UV transparent materials including a melting point of 350° C. or higher. In the illustrated embodiment, the quartz tube may have an outer diameter of approximately 26 mm. An annular flow path 150 is defined between the tube 120 and the surrounding structure 140. Water to be treated in the reactor 110 flows through the flow path 150.

A diffusive surface 160 is secured to the outer surface of the surrounding structure 140. In the illustrated embodiments, the diffusive surface 160 is PTFE heat-shrinking tubing. Specifically, the tubing 160 includes a thickness between 0.10 mm-1.5 mm, with an optimal thickness of 0.3 mm-1.0 mm. In alternative embodiments, the diffusive surface 160 may be composed of alternative materials (a layer comprising Polytetrafluoroethylene (PTFE), etc.). One way of securing the diffusive surface 160 to the surrounding structure 140 is with heat shrinking. The PTFE is a standard, commercially available product, such as a 2:1 PTFE material, available from Zues, Inc., having an expanded minimum inside diameter of 1.500 in. (before shrink) and a recovered wall thickness of 1.036 in. (after shrink).

Figure 2:
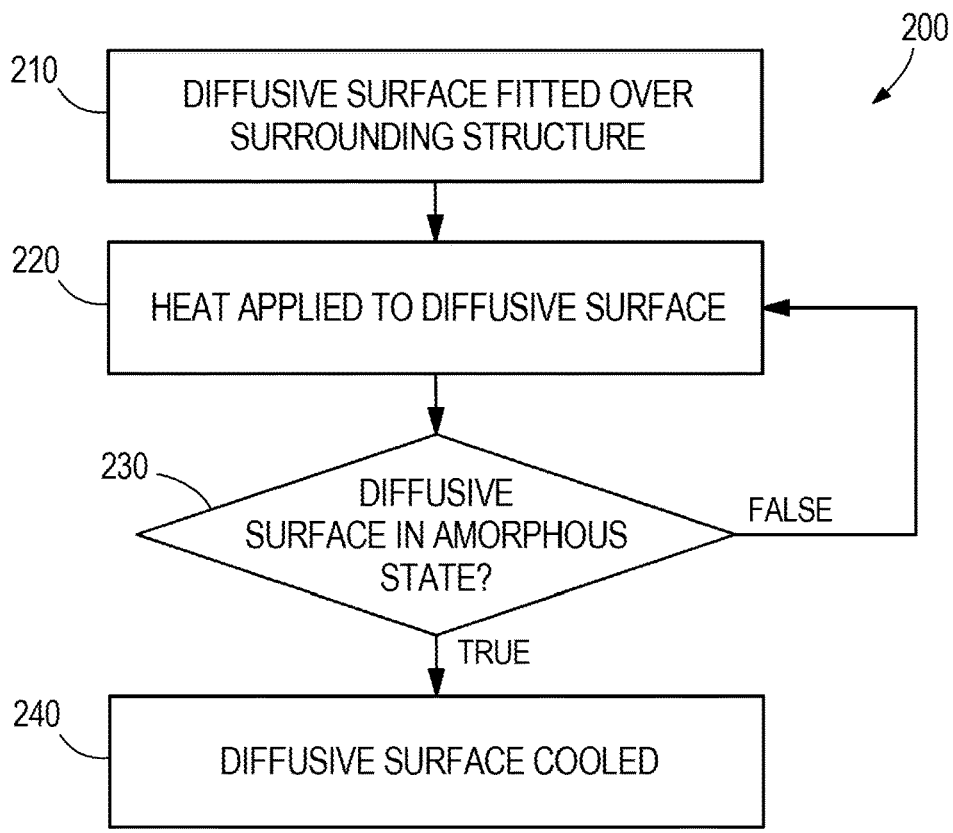
FIG. 2 is a flowchart of process of securing a diffusive surface to a surrounding structure of the UV reactor of FIG. 1.

FIG. 2 illustrates the process 200 of heat shrinking the diffusive surface 160 onto the surrounding structure 140, thereby securing the diffusive surface 160 to the structure 140. The process 200 begins at step 210 where the unshrunk diffusive surface 160 is fitted over the surrounding structure 140. In step 220, heat is applied to the diffusive surface 160, thereby shrinking the diffusive surface 160 to snugly fit around the surrounding structure 140. Heat may be applied to the diffusive surface 160 through various mechanisms (e.g., an oven, a hot air gun, etc.). In the illustrated embodiments, the temperature of the heat is greater than 380° C., with an optimal temperature of 385° C. The heat is applied to the diffusive surface 160 for a sufficient amount of time until the surface 160 completely covers the surrounding structure 140. Specifically, the heat is applied to the diffusive surface 160 for 30-900 seconds.

During the heat shrinking process in step 220, the diffusive surface 160 transitions from a crystalline state to an amorphous state, and is therefore transparent to UV light. At step 230, a user determines the state of the diffusive surface 160. If the user confirms the diffusive surface 160 is amorphous (e.g., TRUE), the process proceeds to step 240. If the user confirms the diffusive surface 160 is not fully amorphous (e.g., FALSE), the process moves to step 220 and the diffusive surface 160 continues to undergo heat shrinking.

In step 240, the diffusive surface 160 is subjected to cooling. Specifically, the diffusive surface 160 is slowly subjected to lower temperatures (e.g., via the oven). Cooling the diffusive surface 160 significantly increases material crystalline levels of the surface 160, thereby enhancing reflectivity. During the cooling process, the diffusive surface 160 is exposed to progressively decreasing temperatures in an incremental manner. In the illustrated embodiments, the cooling rate is between 0.3° C./min to 30° C./min down to 250° C., with an optimal cooling rate being between 0.5° C./min to 3° C./min down to 250° C. The cooling process may continue for a predetermined amount of time, or until the diffusive surface 160 has achieved a specific amount of UVC reflectivity. For example, after the cooling process, the UVC reflectivity of the diffusive surface 160 is approximately 50%-85%, with an optimal UVC reflectivity of 65%-85%.

To minimize the transmissivity (or maximize the diffusivity and/or the reflectivity) of the PTFE in the diffusive surface 160, two factors must be managed carefully to achieve a desired ratio of crystalline and amorphous material. The first factor is the maximum temperature of the heat applied to the diffusive surface 160 in comparison to the melting point temperature of the diffusive surface 160. Ideally, the maximum temperature of the heat is equal to or slightly higher than the melting point temperature of the diffusive surface 160 in order for the diffusive surface 160 to transition from a semi-crystalline structure to an amorphous structure. The second factor is the cooling temperature and rate of cooling applied to the diffusive surface 160 after the maximum temperature is reached. As discussed above with respect to FIG. 2, achieving an optimal cooling rate and incrementally applying specific cooling temperatures increases the crystalline properties within the diffusive surface 160, thereby enhancing the reflectivity of the diffusive surface 160. The optimal cooling range for the PTFE diffusive surface 160 to transition from amorphous to crystalline is 260° C. to 325° C. Therefore, through an optimized manufacturing process, the PTFE heat shrink diffusive surface 160 produces an effective diffusive coating around the surrounding structure 140.

In operation, UV light from the UV source 130 passes through the quartz tube 120 to kill harmful contaminants in the water in the annular flow path 150. The UV light passes through the quartz wall of the surrounding structure 140, reflects off of the diffusive surface 160, passes back through the quartz wall of the surrounding structure 140 and into the annular flow path 150 for another pass through the water. In the illustrated embodiments, the UV contact time with the water during operations is less than one second.

The diffusive surface 160 provides similar or better results than most metal UV reactors, but at a lower cost. In one test, *E coli* log reduction was observed in a test setup simulating the first six years of a Philips 14W UV lamp and water flow rate of 3 L/min. The observed *E coli* log reductions in each simulated year are summarized in Table 1 below.

TABLE 1

| Philips 14 W Lamp simulated life (years) | *E coli* log reduction |
| --- | --- |
| 1 | 7.33 |
| 2 | 6.10 |
| 3 | 6.96 |
| 4 | 7.56 |
| 5 | 5.77 |
| 6 | 5.30 |

Example 1—Heat Shrink Process

In one test of the present invention, the diffusive surface 160 including a PTFE shrink wrap layer was applied to the quartz surrounding structure 140 using the process 200 described with respect to FIG. 2. Specifically, the heat shrink and cooling stages used are reported below in Table 2. The starting detected transmissivity of the diffusive surface 160 was 64% and the lowest detected transmissivity after cooling was about 24%.

TABLE 2

| Temperature (° F.) | Duration (min) | Process |
| --- | --- | --- |
| 725 | 8 | heat shrink |
| 615 | 5 | cool down |
| 605 | 10 | cool down |
| 599 | 15 | cool down |

Example 2—Heat Shrink Process

In another test of the present invention, the diffusive surface 160 (e.g., PTFE shrink wrap) was applied to the quartz surrounding structure 140 using the process 200 described with respect to FIG. 2. The diffusive surface 160 was applied to the quartz surrounding structure 140 using the heat shrink and cooling stages reported below in Table 3. Specifically, the heat shrink and cooling stages used are the same as in the first example, except that the first cooling stage was 2 minutes at 644° F., compared to 5 minutes at 615° F. in the first test. The starting detected transmissivity of the diffusive surface 160 in the second test was 62% and the lowest detected transmissivity after cooling was about 17%.

TABLE 3

| Temperature (° F.) | Duration (min) | Process |
| --- | --- | --- |
| 725 | 8 | heat shrink |
| 644 | 2 | cool down |
| 605 | 10 | cool down |
| 599 | 15 | cool down |

Thus, the UV reactor 110 described above functions as well as a traditional, more expensive (e.g., metal) UV reactor, but is substantially easier and less expensive to manufacture. Furthermore, the implementation of a thicker diffusive surface 160, in addition to the heat shrinking process 200, allows for an increase of crystalline properties within the surface 160, thereby increasing reflectivity and decreasing transmissivity.

Figure 3:
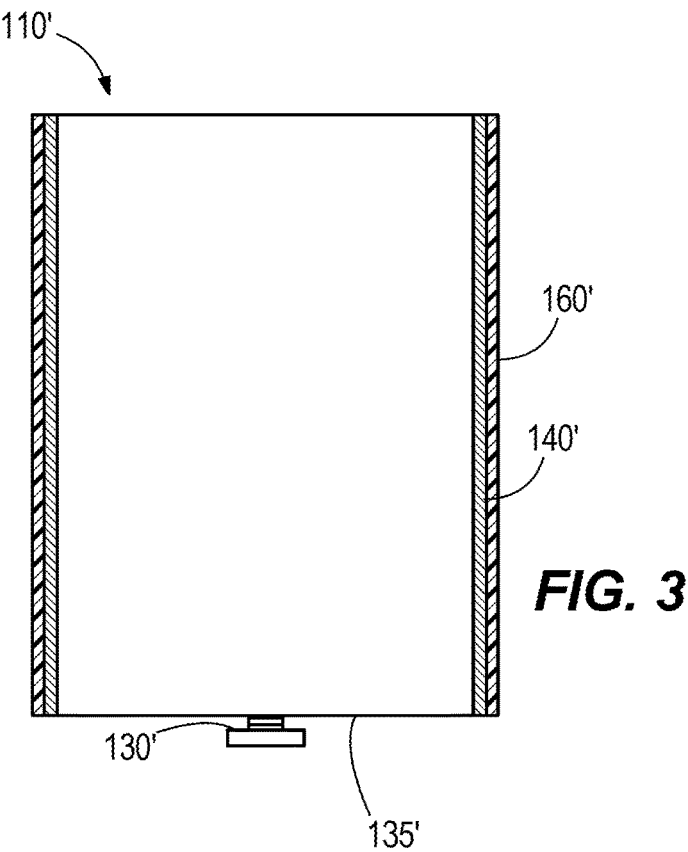
FIG. 3 is a perspective view of an alternative UV reactor of FIG. 1.

FIG. 3 illustrate an alternative UV reactor 110'. The illustrated UV reactor 110' is similar to the reactor 110 described above and includes like parts. The UV reactor 110' differs from the UV reactor 110 because it is used to treat stagnant water rather than flowing water, as will be described below. Components that are similar to those described in the UV reactor 110 have the same reference number plus prime.

The reactor 110' is composed of a UV transmissive material. The reactor 110' includes a UV light source 130' positioned outside the reactor 110' on a transparent end wall 135' of the reactor 110', and a surrounding structure 140' positioned around the reactor 110'. The UV source 130' may include one or more UV-LEDs which radiate UV light into water within the reactor 110' via the transparent wall 135'. In the illustrated embodiment, the surrounding structure 140' is quartz. However, in alternative embodiments, the surrounding structure 140' may be composed of alternative UV transmissive materials including a melting point of 350° C. or higher. As illustrated in FIG. 3, the UV reactor 110' is in the form of a storage vessel. As such, the UV reactor 110' primarily treats stagnant water for periods of time.

A diffusive surface 160' is secured to the outer surface of the surrounding structure 140'. In the illustrated embodiments, the diffusive surface 160' is PTFE heat-shrink tubing, as described above with respect to FIG. 1. Specifically, the diffusive surface 160' is secured to the surrounding structure 140' via the process 200, as described with respect to FIG. 2.

Various features and advantages of the invention are set forth in the following claims.

What is claimed is:

1. A UV reactor for treating water, the reactor comprising:
    a UV source;
    a tube positioned around the UV source;
    a surrounding structure coaxially surrounding the tube;
    a flow path positioned between the tube and the surrounding structure for a flow of water to be treated; and
    a diffusive surface positioned around the surrounding structure to reflect UV light from the UV source back into the flow path.

2. The reactor of claim 1, wherein the diffusive surface is composed of PTFE heat shrink tubing.

3. The reactor of claim 1, wherein the diffusive surface includes a thickness within the range of 0.10 mm to 1.5 mm.

4. The reactor of claim 1, wherein the diffusive surface is secured to the surrounding structure via a heat shrinking process.

5. The reactor of claim 4, further comprising an oven configured to supply heat to the diffusive surface, thereby shrinking the diffusive surface relative to the surrounding structure.

6. The reactor of claim 5, wherein the oven is configured to supply heat to the diffusive surface for 30 seconds to 900 seconds.

7. The reactor of claim 5, wherein the heat supplied to the diffusive surface includes a temperature greater than or equal to a melting point temperature of the diffusive surface.

8. The reactor of claim 5, wherein the oven is configured to cool the diffusive surface using a predetermined cooling rate.

9. The reactor of claim 8, wherein the predetermined cooling rate is 0.3° C./min to 30° C./min.

10. The reactor of claim 1, wherein the tube and the surrounding structure are composed of quartz.

11. A method of securing a diffusive surface to a surrounding structure of a UV reactor, the UV reactor including a UV source, a tube surrounding the UV source, the surrounding structure coaxially surrounding the tube, and the diffusive surface positioned around the surrounding structure, the method comprising:
    fitting the diffusive surface over the surrounding structure;
    applying heat to the diffusive surface;
    determining the material property state of the diffusive surface; and
    cooling the diffusive surface after determining the diffusive surface is in an amorphous state.

12. The method of claim 11, wherein cooling the diffusive surface further includes:
    exposing the diffusive surface to a first temperature for a first predetermined amount of time;
    exposing the diffusive surface to a second temperature lower than the first temperature for a second predetermined amount of time;
    measuring reflectivity of the diffusive surface; and
    removing the diffusive surface from cooling when the reflectivity of the diffusive surface is equal to a predetermined reflectivity range.

13. The method of claim 12, wherein the predetermined reflectivity range is 50%-85% reflectivity.

14. The method of claim 11, wherein cooling the diffusive surface further includes cooling the diffusive surface via a cooling rate between 0.3° C./min and 30° C./min.

15. The method of claim 11, wherein applying heat to the diffusive surface further includes applying heat having a temperature greater than or equal to a melting point temperature of the diffusive surface.

16. The method of claim 11, wherein determining the material property state of the diffusive surface includes measuring transparency of the diffusive surface.

17. The method of claim 11, wherein applying heat to the diffusive surface results in the diffusive surface forming a gel relative to the surrounding surface.

18. The method of claim 11, wherein applying heat to the diffusive surface further includes applying heat to the diffusive surface for 30 seconds to 900 seconds.

19. The method of claim 11, wherein applying heat to the diffusive surface further includes placing the UV reactor within an oven, and operating the oven to emit heat.

20. A method for treating water via a UV reactor, wherein the UV reactor includes a UV source, a tube surrounding the UV source, a surrounding structure coaxially surrounding the tube, and a PTFE diffusive surface positioned around the surrounding structure, the method comprising:
    emitting UV light via the UV light source;
    transmitting the UV light through the tube and into an annular flow path between the tube and the surrounding structure;
    transmitting the UV light through a quartz wall of the surrounding structure; and
    reflecting the UV light off of the PTFE diffusive surface, through the quartz wall of the surrounding structure, and through the annular flow path.

* * * * *